United States Patent
Huang et al.

(10) Patent No.: US 8,273,278 B2
(45) Date of Patent: Sep. 25, 2012

(54) PROCESS OF MAKING WATER-INSOLUBLE POLYGLUTAMIC ACID FIBERS

(75) Inventors: Jo-Wei Huang, Zhongli (TW); Mei-Ting Fan Chiang, Zhongli (TW); Ken-Yuan Chang, Zhongli (TW)

(73) Assignee: Far East New Century Corporation, Taipei (TW)

( * ) Notice: Subject to any disclaimer, the term of this patent is extended or adjusted under 35 U.S.C. 154(b) by 144 days.

(21) Appl. No.: 12/757,288

(22) Filed: Apr. 9, 2010

(65) Prior Publication Data
US 2010/0256326 A1    Oct. 7, 2010

(30) Foreign Application Priority Data
Apr. 21, 2009   (CN) .......................... 2009 1 0137040

(51) Int. Cl.
  D01D 1/02 (2006.01)
  D01D 5/06 (2006.01)
  D01F 6/68 (2006.01)
(52) U.S. Cl. ............... 264/184; 264/178 F; 264/203
(58) Field of Classification Search .......... 264/176.1, 264/178 R, 183, 184, 203, 178 F
See application file for complete search history.

(56) References Cited

U.S. PATENT DOCUMENTS

| | | | | |
|---|---|---|---|---|
| 3,719,520 | A | * | 3/1973 | Fujimoto et al. ............ 442/115 |
| 4,965,128 | A | * | 10/1990 | Greidanus et al. ........... 428/398 |
| 5,279,821 | A | | 1/1994 | Hirayama et al. |
| 5,955,549 | A | * | 9/1999 | Chang et al. ................. 525/418 |
| 6,998,367 | B2 | | 2/2006 | Qin |
| 7,125,960 | B2 | | 10/2006 | Keiichi |
| 2007/0018361 | A1 | * | 1/2007 | Xu ............................... 264/465 |
| 2009/0031691 | A1 | * | 2/2009 | Tajima et al. ................. 57/258 |

FOREIGN PATENT DOCUMENTS

| | | | |
|---|---|---|---|
| EP | 0 445 923 B1 | 12/1995 | |
| JP | 04370217 A | * 12/1992 | ............. 264/184 |
| JP | 6322358 | 11/1994 | |
| JP | 11343339 | 12/1999 | |
| JP | 2009191164 A | * 8/2009 | |

OTHER PUBLICATIONS

English language translation of abstract of JP 6322358 (published Nov. 22, 1994).
English language translation of abstract of JP 11343339 (published Dec. 14, 1999).

* cited by examiner

*Primary Examiner* — Leo B Tentoni
(74) *Attorney, Agent, or Firm* — Thomas, Kayden, Horstemeyer & Risley, LLP

(57) ABSTRACT

A water-insoluble polyglutamic acid (PGA) fiber and a preparation method thereof are provided. In the preparation method, the PGA is cross-linked by a cross-linking agent and then passes through a spinning nozzle to form PGA fibers. Therefore, the highly water-absorbing PGA, which cannot be spun by conventional methods, can be spun to form PGA fibers and maintain the high water-absorption ability.

16 Claims, 1 Drawing Sheet

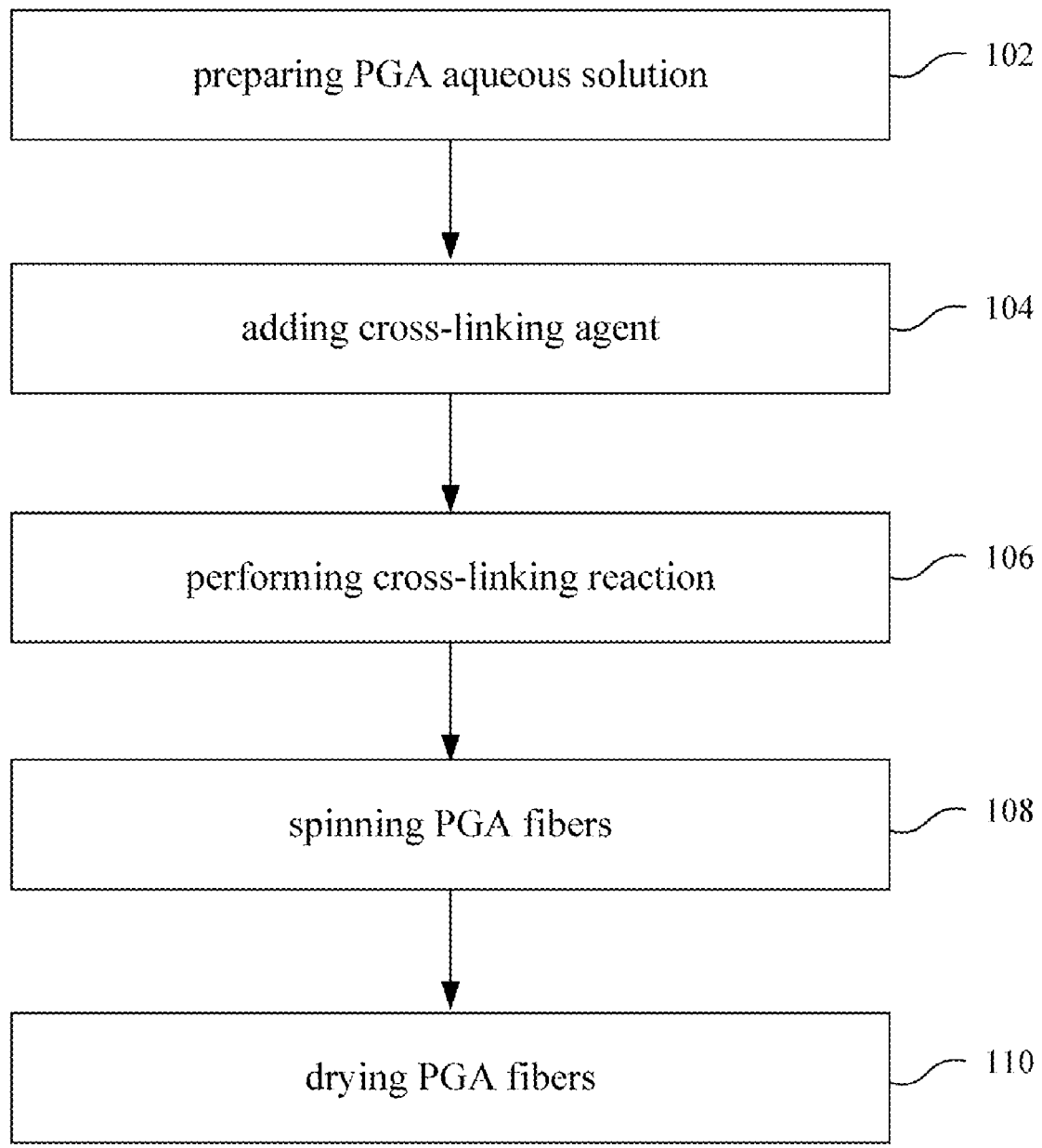

PROCESS OF MAKING WATER-INSOLUBLE POLYGLUTAMIC ACID FIBERS

CROSS-REFERENCE TO RELATED APPLICATION

This application claims the priority benefit of Taiwan application serial no. 98111559, filed Apr. 7, 2009, the full disclosure of which is incorporated herein by reference.

BACKGROUND

1. Technical Field

The disclosure relates to a method of preparing water-insoluble fibers from an extremely hydrophilic polypeptide, which is very soluble in water. More particularly, the disclosure relates to a water-insoluble polyglutamic acid fibers and a preparation method thereof.

2. Description of Related Art

There are two kinds of commonly used materials with high water-absorption ability. One is based on acrylic acid, and the other is based on carbohydrate. For the one based on acrylic acid, the material is low-cost and has significant water-absorption ability, but it is not biodegradable and will therefore cause environmental problem. For the one based on carbohydrate, such as starch, chitin, sodium alginate, and carboxymethyl cellulose (CMC), the material is low-cost and biodegradable, but its water-absorption ability is limited. Therefore, it is needed to develop a material that has significant water-absorption ability and biodegradability.

It is well known that polyglutamic acid (PGA) has high water-absorption ability and high biodegradability, and PGA is also very soluble in water. Therefore, PGA can be easily dissolved once if PGA gets in touch with water or even only exposes to water vapor in the air. This is why PGA without any treatment cannot be used as water-absorption material and hence cannot be spun into fibers. Conventionally, PGA is cross-linked to have its conformation maintained and also to avoid being dissolved.

The methods of cross-linking PGA include physical methods and chemical methods. In physical methods, e.g. JP Publication No. 6-322358, the PGA is cross-linked by γ-ray to produce hydrogel with high water-absorption ability. However, the γ-ray equipment is complicated and expensive. Therefore, this method is not suitable for industry.

In chemical methods, a cross-linking agent is used to perform cross-linking reaction on PGA. Conventional cross-linking agents contain functional groups of dialdehyde, diamine, or diepoxide. For example, JP Publication No. 11-343339 discloses a method of isolating a high concentration γ-PGA from a culture broth, and using the isolated γ-PGA as the starting material for the cross-linking reaction with a diepoxy compound to obtain a biodegradable, water absorbable hydrogel. In U.S. Pat. No. 6,998,367, a cross-linking agent having dialdehyde, diamine, or diepoxide functional groups and a metal ion were used to cross-link PGA to produce water absorbable material that is water-insoluble. In U.S. Pat. No. 7,125,960, glutaraldehyde, ethylene glycol diglycidyl ether, and carbodiimide were used to cross-link PGA to obtain water absorbable gel.

The methods above have disclosed that water-insoluble PGA gel can be obtained by cross-linking technique, but the water-absorption ability of PGA was largely decreased. Hence, the biomedical applications of PGA are limited. Accordingly, if PGA can be spun into water-insoluble fibers, the above mentioned problem can be solved. However, the unmodified PGA is very soluble in water, and hence conventional spinning methods cannot be used to spin PGA fibers. Although the available techniques are able to produce water-insoluble PGA, only formation of PGA gel was disclosed. Nothing about how to form PGA fibers by spinning technique was disclosed. Moreover, the PGA gel does not provide sufficient flowability and hence cannot be spun by conventional spinning methods.

SUMMARY

Accordingly, a method of preparing water-insoluble polyglutamic acid (PGA) fibers and PGA fibers made by the same method is provided to solve the prior problems.

According to an embodiment of this invention, the method of spinning water-insoluble PGA fibers comprises the following steps. First, a PGA aqueous solution having an initial viscosity of $\eta_0$ is prepared. Then, a cross-linking agent is added to the PGA aqueous solution to perform PGA cross-linking reaction. Next, the PGA cross-linking reaction is performed until a spinnable viscosity is reached to form PGA fibers by spinning out the cross-linked PGA solution from a spinning nozzle, wherein the spinnable viscosity is from $[\eta_0 + \frac{1}{500}(\eta_f - \eta_0)]$ to $<\eta_f$. Finally, the PGA fibers are dried to perform post-cross-linking reaction to completely react the residual cross-linking agent.

The water-insoluble PGA fibers can be made by the above method.

It is to be understood that both the foregoing general description and the following detailed description are by examples, and are intended to provide further explanation of the invention as claimed.

BRIEF DESCRIPTION OF THE DRAWINGS

FIG. 1 is a process flow of preparing polyglutamic acid fibers according to an embodiment of this invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Since polyglutamic acid (PGA) has high water-absorption ability and high water solubility, PGA has to be shaped by cross-linking treatment for various applications. Although some cross-linking treatments of PGA have been disclosed, all the obtained PGA is in the forms of gel, grain, or membrane. PGA in the form of fiber has not been disclosed yet.

Any person skilled in the art can understand that the super-high water-absorption ability of the PGA leads spinning the PGA fibers impossible if the PGA is not modified or processed at all, since it is hard to maintain the conformation of the PGA fibers during the conventional spinning process. Moreover, even if the PGA fibers can be obtained, the PGA fibers will be dissolved after absorbing water vapor when the PGA fibers are exposed in the air. Furthermore, if a cross-linking agent is added into the PGA solution to cross-link the PGA, the viscosity of the PGA solution is often too high to be spun because the cross-linking reaction is overly performed. Therefore, it is difficult to control the cross-linking degree of the PGA solution to make the spinning of PGA fibers possible and still maintain the conformation of the PGA fibers at the same time.

Accordingly, a method of spinning water-insoluble PGA fibers is provided. FIG. 1 is a process flow of preparing polyglutamic acid fibers according to an embodiment of this invention.

In step 102, a PGA aqueous solution (abbreviated as PGA solution below) is prepared. The method of preparing the PGA solution has no special limitations. Any method that can prepare the PGA solution can be used. For example, PGA or its sodium form can be directly added into pure water. Then, the solution is stirred until the PGA or its sodium form is completely dissolved in the water to reach the desired PGA concentration. Since it is hard to spin the PGA fibers when the solid content of the PGA solution is too low or too high, wherein the solid content is the residual solid substance after removing the liquid substance of the PGA solution. Therefore, the PGA concentration of the PGA solution is 6-30 wt % according to an embodiment and more preferably 6-25 wt % according to another embodiment.

In step 104, a cross-linking agent is added into the PGA solution to start the cross-linking reaction of the PGA. Since the PGA has many free carboxylic acid groups (—COOH) to be cross-linked, the cross-linking agent is better to has at least two functional groups that can react with the free carboxylic acid groups. Therefore, the cross-linking agent can be a compound that has at least two functional groups of epoxy, amine, aldehyde, or double-bound, for example.

The cross-linking agent having at least two epoxy groups includes, but is not limited to, polyglycidyl ether, such as ethylene glycol diglycidyl ether, diglycerol polyglycidyl ether, polyglycerol polyglycidyl ether, or polyoxyethylene sorbitol polyglycidyl ether.

The cross-linking agent having at least two amine groups includes, but is not limited to, ethylene diamine, which can be referred to U.S. Pat. No. 5,279,821.

The cross-linking agent having at least two aldehyde groups includes, but is not limited to, glutaraldehyde, which can be referred to U.S. Pat. Nos. 6,699,367 and 7,125,960.

The cross-linking agent having at least two double-bond groups includes, but is not limited to, N,N'-(1,2-dihydroxyethylene).

If the added amount of the cross-linking agent is not enough to maintain the conformation of the PGA fibers, the PGA fibers will be dissolved immediately after absorbing water vapor in the air. However, if the added amount of the cross-linking agent is too much, the cross-linking degree of the PGA solution will be too high to spin the PGA solution. In addition, the excessive cross-linking agent is also a waste. Therefore, the ratio of the added equivalent of the cross-linking agent over the equivalent of the PGA's carboxylic acid groups is 1:45-1:1 according to an embodiment, and 1:15-1:1 according to another embodiment.

In step 106, after adding the cross-linking agent, the cross-linking agent can immediately react with PGA to start the cross-linking reaction. The cross-linking reaction can be performed even under room temperature. Therefore, the reaction temperature has no special limitations. However, in view of the commercial production, the reaction rate can be increased by heating. Since PGA is a polypeptide molecule, PGA can be denatured or decomposed at high temperature. Therefore, the cross-linking temperature is 35-85° C. according to an embodiment, and 45-75° C. according to another embodiment.

In order to increase the rate of the cross-linking reaction, any persons skilled in the art can understand that stirring the PGA solution containing the cross-linking agent can be further used to increase the cross-linking rate. The PGA solution containing the cross-linking agent can be stirred by a stir rod, for example.

It is necessary to cross-link PGA to convert the water-soluble PGA into water-insoluble PGA. However, if PGA is over cross-linked, the viscosity is often too high to spin out PGA fibers from a spin nozzle. It is found in this invention that PGA can be spun after being partially cross-linked. In this case, the PGA fibers will not be dissolved immediately after being exposed to the air. Subsequently, the post cross-linking reaction can be performed on the PGA fibers to reduce its water solubility and hence mechanical strength can be improved.

Since the viscosity of the PGA solution will be increased with the increase of the cross-linking degree of the PGA. When the viscosity of the PGA solution is increased to a certain value, the partially cross-linked PGA in the solution starts to climb the stir rod. The phenomenon is called "rod climbing." Accordingly, it is assumed that the initial viscosity of the PGA solution is $\eta_0$, and the viscosity of the PGA solution starting to "climb rod" is $\eta_f$. Therefore, in step 108, the spinnable viscosity of the PGA solution is $[\eta_0+\frac{1}{500}(\eta_f-\eta_0)]$ to $<\eta_f$ according to an embodiment, and $[\eta_0+\frac{1}{4}(\eta_f-\eta_0)]$ to $[\eta_0+\frac{3}{4}(\eta_f-\eta_0)]$ according to another embodiment.

The spinning method for spinning the PGA fibers can be any available spinning techniques such as dry spinning, wet spinning, or electrospinning, etc. Any person skilled in the art knows that wet spinning technique utilizes a coagulant bath to solidify fibers, but dry spinning and electrospinning do not need coagulant bath. Therefore, when wet spinning is performed to spin PGA fibers, the coagulant bath usually contains an organic solvent which is preferably alcohol, ether, ketone, or any combinations thereof that has 1-5 carbons. The alcohol above can be, but not limited by, methanol, ethanol, or iso-propanol, for example. The ether above can be, but not limited by, dimethyl ether, diethyl ether, or any combinations thereof, for example. The ketone above can be, but not limited by, acetone, for example. Since a person skilled in the art understands the related techniques about the wet spinning, and the related technical details can be determined by himself/herself according to this disclosure, the related technical details are omitted here.

Moreover, the cross-linking reaction will proceed until the reaction is completed, and the wet spinning needs time to complete the spinning process for all of the partially cross-linked PGA solution. Therefore, it is better to reduce the reaction rate to prevent the viscosity of the PGA solution from being too high to pass the spin nozzle. One skilled in the art can understand that if a continuous production process is used to cross-link and spin out the PGA fibers, it may not need to reduce the cross-linking reaction rate.

The method for reducing the reaction rate can be any available methods without special limitations. For example, the reaction temperature of the PGA solution having the spinnable viscosity can be decreased to decelerate the cross-linking reaction. The reaction temperature can be decreased to 4-10° C. or 6° C. to effectively decrease the reaction rate without solidifying the PGA solution, for example. The temperature can be decreased by keeping the PGA solution in an ice bath or circulating cooling water in the wet spinning step.

According to another embodiment, a retardant agent can be added to decrease the cross-linking reaction rate. The retardant agent can be, but not limited by, D-glutamic acid.

In step 110, the PGA fibers are dried to facilitate the cross-linking reaction to be proceeded in the PGA fibers, i.e. the post-cross-linking reaction and remove the excessive water to strengthen the PGA fibers' structure. If the drying temperature is too high, some side reactions, such as PGA decomposition reaction may occur. If the drying temperature is too low, the rate of the post-cross-linking reaction will be too slow. Therefore, the drying temperature can be 25-90° C. according to an embodiment, 35-85° C. according to another embodiment, and 45-75° C. according to yet another embodiment, for example. The drying time can be 20 hours, for example.

The embodiments below illustrate the spinning method of the PGA fibers and the tests made for the PGA fibers. These illustrations below are not used to limit the claim's scope, any ones skilled in the art can easily made modifications and variations which are covered by the claims of this invention.

Preparation of PGA Fibers

Embodiment 1

Sodium polyglutamate (from Vedan Corp.) was mixed with water to prepare a 6 wt % of PGA solution. The initial viscosity of the PGA solution was 56.4 cp.

Next, a cross-linking agent, ethylene glycol diglycidyl ether (from TOKYO YASEI), was added into the PGA solution. The added amount of the ethylene glycol diglycidyl ether was 7 μL/100 g PGA solution, which was equal to ¼ equivalent of ethylene glycol diglycidyl ether per equivalent of PGA. After adding the cross-linking agent, the PGA solution was stirred at a speed of 50 rpm to have the cross-linking reaction performed under 60° C. If the cross-linking reaction was not interrupted until the time of "rod climbing," which took about 5.5 hours, the rod-climbing viscosity was 997.2 cp.

The spinning test was performed when the viscosity was increased to 82 cp (about 240 minutes) to let the PGA solution pass the spinning nozzle for obtaining PGA fibers. In order to prevent the PGA solution from being over cross-linked before passing the spinning nozzle, the temperature of the remainder PGA solution was kept as low as 6° C.

The obtained PGA fibers were then solidified by passing through iso-propanol (from ECHO chemical, Model No. TG-078-000000-75NL). After collecting solidified PGA fibers, the solidified PGA fibers were dried in an oven at a temperature of 60° C. for about 20 hours to successfully obtain the final PGA fibers.

Embodiment 2

The operation conditions of Embodiment 2 were about the same as those of Embodiment 1. The only difference was the concentration of the initial PGA solution was 10 wt %, and the added amount of ethylene glycol diglycidyl ether was 5 μL/100 g PGA solution, which was equal to ⅕ equivalent of ethylene glycol diglycidyl ether per equivalent of PGA.

The initial viscosity of the PGA solution was 60.2 cp, and the rod-climbing viscosity was 1247.4 cp (cross-linked for about 2.3 h). In this Embodiment, the spinning started when the viscosity of PGA solution was 92.3 cp (about 40 minutes). The PGA fibers can be successfully obtained.

Embodiment 3

The operation conditions of Embodiment 3 were about the same as those of Embodiment 1. The only difference was the concentration of the initial PGA solution was 15 wt %, and the added amount of ethylene glycol diglycidyl ether was 5 μL/100 g PGA solution, which was equal to 1/14 equivalent of ethylene glycol diglycidyl ether per equivalent of PGA.

The initial viscosity of the PGA solution was 74.6 cp, and the rod-climbing viscosity was 964.8 cp (cross-linked for about 2.2 h). In this Embodiment, the spinning started when the viscosity of PGA solution was 152.1 cp (about 90 minutes). The PGA fibers can be successfully obtained.

Embodiment 4

The operation conditions of Embodiment 4 were about the same as those of Embodiment 1. The only difference was the concentration of the initial PGA solution was 20 wt %, and the added amount of ethylene glycol diglycidyl ether was 6 μL/100 g PGA solution, which was equal to 1/15 equivalent of ethylene glycol diglycidyl ether per equivalent of PGA.

The initial viscosity of the PGA solution was 87.8 cp, and the rod-climbing viscosity was 1124 cp (cross-linked for about 1.9 h). In this Embodiment, the spinning started when the viscosity of PGA solution was 185.3 cp (about 60 minutes). The PGA fibers can be successfully obtained.

Embodiment 5

The operation conditions of Embodiment 5 were about the same as those of Embodiment 1. The only difference was the concentration of the initial PGA solution was 20 wt %, and the added amount of ethylene glycol diglycidyl ether was 2 μL/100 g PGA solution, which was equal to 1/45 equivalent of ethylene glycol diglycidyl ether per equivalent of PGA.

The initial viscosity of the PGA solution was 83.7 cp, and the rod-climbing viscosity was 1012.5 cp (cross-linked for about 2.6 h). In this Embodiment, the spinning started when the viscosity of PGA solution was 133.5 cp (about 60 minutes). The PGA fibers can be successfully obtained.

Embodiment 6

The operation conditions of Embodiment 6 were about the same as those of Embodiment 1. The only difference was the concentration of the initial PGA solution was 25 wt %, and the added amount of ethylene glycol diglycidyl ether was 3 μL/100 g PGA solution, which was equal to 1/40 equivalent of ethylene glycol diglycidyl ether per equivalent of PGA.

The initial viscosity of the PGA solution was 96.3 cp, and the rod-climbing viscosity was 1221.9 cp (cross-linked for about 1.6 h). In this Embodiment, the spinning started when the viscosity of PGA solution was 225.6 cp (about 60 minutes). The PGA fibers can be successfully obtained.

Comparative Embodiment 1

The operation conditions of Comparative Embodiment 1 were about the same as those of Embodiment 4, but the spinning started at 87.9 cp (cross-linked for only about 10 minutes), which was just a little bit higher than the initial viscosity, 87.8 cp. The result showed that although the cross-linking degree was not enough, the PGA fibers were still formed in the iso-propanol. However, once the PGA fibers left the iso-propanol and exposed in the air for only 30 seconds, the PGA fibers were dissolved after absorption of water vapor in the air.

Comparative Embodiment 2

The operation conditions of Comparative Embodiment 1 were about the same as those of Embodiment 4, but the spinning started at 1130 cp (cross-linked for about 2 hours), which was higher than the rod-climbing viscosity, 1124 cp.

Since the viscosity was higher than the rod-climbing viscosity, the PGA solution became an elastic solid. Therefore, the PGA solution was hard to pass the spinning nozzle to obtain PGA fibers.

Tests for PGA Fibers

The tests of water absorbability and the weight loss after washing were done for the obtained PGA fibers of Embodiments 1-6 to understand whether the PGA fibers can maintain both of the high water absorption ability and the fiber conformation at the same time. The test results are shown in Table 1 below.

TABLE 1

The tests of water absorbability and the weight loss after washing for PGA fibers.

| Embodiment | 1 | 2 | 3 | 4 | 5 | 6 |
|---|---|---|---|---|---|---|
| water absorbability (weight ratio) | 179.2 | 198.6 | 217.5 | 220.3 | 215.6 | 223.6 |
| weight loss after washing (wt %) | 10.6 | 7.2 | 6.5 | 7.2 | 9.2 | 9.1 |

In the test of water absorption, PGA fibers were put in excessive amount of deionized water to sufficiently absorb water. Then, the surplus water was removed. The weights of PGA fibers before absorbing water and after absorbing water were both measured. The water absorbability was calculated by the following formula (I):

(weight after absorbing water−weight before absorbing water)/weight before absorbing water     (I)

In the test of weight loss after washing, PGA fibers were put in excessive amount of deionized water to sufficiently absorb water and then stayed for 1 hour. Then, the surplus water was removed. Next, the PGA fibers were dried in an oven until the weight of PGA fibers remains unchanged. The weights of PGA fibers before washing and after drying were both measured. The weight loss percentage was calculated by the following formula (II):

(weight before washing−weight after drying)/weight before washing×100%     (II)

From the tested results of the water absorbability, it can be known that the PGA fibers of Embodiments 1-6 could still absorb water more than 150 times of their weight. And more surprisingly, the conformation of the PGA fibers could maintain for at least one month without being decomposed.

From the tested results of the weight loss after washing, the weight losses were all smaller than 15 wt % after the PGA fibers sufficiently absorbed water and stayed in water for 1 hour. The results show that the method provided by this disclosure can solve the conventional problem to successfully obtain "water-insoluble PGA fibers" with weight loss smaller than 15 wt % after absorbing water.

Accordingly, the spinning method of the PGA fibers and the obtained PGA fibers provided by this disclosure have completely solved the conventional problems of being unable to spin the PGA fibers and maintain the conformation of the PGA fibers.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A method of spinning water-insoluble polyglutamic acid (PGA) fibers, comprising:
    (a) preparing a PGA aqueous solution having an initial viscosity of $\eta_0$;
    (b) adding a cross-linking agent to the PGA aqueous solution to perform cross-linking reaction;
    (c) performing the cross-linking reaction until a spinnable viscosity is reached, wherein the spinnable viscosity is from $[\eta_0 + 1/500(\eta_f - \eta_0)]$ to $<\eta_f$, and the $\eta_f$ is the viscosity when the PGA aqueous solution begins to climb rod; and
    (d) forming PGA fibers by spinning out the cross-linked PGA solution from a spinning nozzle.

2. The method of claim 1, wherein the cross-linking agent has at least two functional groups of epoxy, amine, aldehyde or double bonds.

3. The method of claim 2, wherein the cross-linking agent having at least two epoxy functional groups is polyglycidyl ether.

4. The method of claim 2, wherein the cross-linking agent having at least two epoxy functional groups is ethylene glycol diglycidyl ether, diglycerol polyglycidyl ether, polyglycerol polyglycidyl ether, or polyoxyethylene sorbitol polyglycidyl ether.

5. The method of claim 1, wherein the equivalent ratio of the cross-linking agent over the PGA's carboxylic acid groups is 1:45-1:1.

6. The method of claim 1, wherein the temperature of the cross-linking reaction is 25-90° C.

7. The method of claim 1, wherein the spinnable viscosity is from $[\eta_0 + 1/4(\eta_f - \eta_0)]$ to $<[\eta_0 + 3/4(\eta_f - \eta_0)]\eta_f$.

8. The method of claim 1, further comprising a step (e) reducing the rate of the cross-linking reaction between the step (c) and the step (d).

9. The method of claim 8, wherein the method of reducing the rate of the cross-linking reaction is decreasing the reaction temperature.

10. The method of claim 1, further comprising a step (f) solidifying the PGA fibers by passing through a coagulant bath after the step (d).

11. The method of claim 10, wherein the coagulant bath is a solvent of alcohol, ether, ketone or any combinations thereof that has 1-5 carbons.

12. The method of claim 11, wherein the alcohol is methanol, ethanol, iso-propanol, or any combinations thereof.

13. The method of claim 11, wherein the ether is di-ethyl ether, di-methyl ether or any combinations thereof.

14. The method of claim 11, wherein the ketone comprises acetone.

15. The method of claim 10, further comprising a step (g) drying the PGA fibers to perform post-cross-linking reaction.

16. The method of claim 15, wherein the temperature of the drying is 35-85° C.

* * * * *